(12) United States Patent
Breuer et al.

(10) Patent No.: US 10,636,290 B2
(45) Date of Patent: Apr. 28, 2020

(54) COMMUNICATION INTERFACE DEVICE FOR A SOLID-STATE LUMINAIRE

(71) Applicants: Christian Breuer, Newburyport, MA (US); Bernhard Siessegger, Danvers, MA (US)

(72) Inventors: Christian Breuer, Newburyport, MA (US); Bernhard Siessegger, Danvers, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 744 days.

(21) Appl. No.: 14/668,727

(22) Filed: Mar. 25, 2015

(65) Prior Publication Data

US 2015/0279207 A1    Oct. 1, 2015

Related U.S. Application Data

(60) Provisional application No. 61/970,305, filed on Mar. 25, 2014.

(51) Int. Cl.
*G08C 19/16* (2006.01)
*G08C 23/04* (2006.01)
(Continued)

(52) U.S. Cl.
CPC ............. *G08C 19/16* (2013.01); *G08C 17/02* (2013.01); *G08C 23/04* (2013.01);
(Continued)

(58) Field of Classification Search
CPC ............. H04B 10/116; H04B 10/1149; H04B 2203/5416; H05B 33/0845; H05B 37/0245; H05B 39/047
(Continued)

(56) References Cited

U.S. PATENT DOCUMENTS

| 4,450,384 A * | 5/1984 | Krokaugger ......... | H05B 39/047 |
|---|---|---|---|
| | | | 315/127 |
| 8,107,825 B2 * | 1/2012 | Rajagopal ............ | H04B 10/116 |
| | | | 398/172 |

(Continued)

OTHER PUBLICATIONS

"Circuit." The Hutchinson Unabridged Encyclopedia with Atlas and Weather Guide, edited by Helicon, 1st edition, 2016. Credo Reference, http://search.credoreference.com/content/entry/heliconhe/circuit/0. Accessed Jun. 19, 2017.*

(Continued)

*Primary Examiner* — Tanya T Motsinger
(74) *Attorney, Agent, or Firm* — Yutian Ling (57) ABSTRACT

A device is disclosed for providing a communication interface for a solid-state luminaire. The disclosed device may be configured, for example, as a dongle to be electrically coupled with power lines between a driver and solid-state light source. The device may draw power from the power lines, while also adjusting and, if desired, monitoring current going to the light source. In some embodiments, the device splits current received from the driver into a first portion that is returned to the driver or consumed within the device and a second portion that is time-modulated and delivered to the light source. In some other embodiments, the device provides a time-varying impedance in series with the driver, reducing current received by the light source in a time-modulated manner. In either case, the device optionally may be configured to cause the light source to output a pulsing light signal encoded with data.

20 Claims, 4 Drawing Sheets

(51) Int. Cl.
*G08C 17/02* (2006.01)
*H05B 41/44* (2006.01)
*H05B 33/08* (2020.01)

(52) U.S. Cl.
CPC ... *G08C 2201/50* (2013.01); *G09G 2310/027* (2013.01); *G09G 2310/0262* (2013.01); *G09G 2310/0267* (2013.01); *G09G 2310/0272* (2013.01); *H05B 33/0803* (2013.01); *H05B 41/44* (2013.01)

(58) Field of Classification Search
USPC .................. 398/127, 128, 130, 172, 187
See application file for complete search history.

(56) References Cited

U.S. PATENT DOCUMENTS

| | | | | |
|---|---|---|---|---|
| 8,188,878 | B2* | 5/2012 | Pederson | G07C 9/00158 340/815.45 |
| 8,428,469 | B2* | 4/2013 | Kim | H04B 10/116 398/127 |
| 2002/0048068 | A1* | 4/2002 | Tan | H04B 10/1143 398/135 |
| 2003/0185384 | A1* | 10/2003 | Bahl | H04M 19/00 379/387.01 |
| 2004/0065852 | A1* | 4/2004 | Harrell | A43D 25/20 250/504 R |
| 2005/0169643 | A1* | 8/2005 | Franklin | H04B 10/1141 398/187 |
| 2008/0208489 | A1* | 8/2008 | Cox | G01R 19/2513 702/57 |
| 2008/0258551 | A1* | 10/2008 | Chitta | H04L 25/028 307/3 |
| 2010/0079262 | A1* | 4/2010 | Van Laanen | G05B 19/0423 340/12.32 |
| 2010/0135667 | A1* | 6/2010 | Grace | H04B 10/1143 398/106 |
| 2011/0069960 | A1* | 3/2011 | Knapp | H04L 12/43 398/103 |
| 2013/0127362 | A1* | 5/2013 | Trainor | H02J 9/065 315/224 |
| 2013/0147376 | A1* | 6/2013 | Trainor | H02J 9/065 315/200 R |
| 2014/0197758 | A1* | 7/2014 | Thomas | H05B 37/02 315/297 |
| 2014/0218978 | A1* | 8/2014 | Heuken | H02M 3/33523 363/21.16 |
| 2014/0270793 | A1* | 9/2014 | Bradford | H04B 10/116 398/118 |
| 2015/0008844 | A1* | 1/2015 | Wilson | H02J 9/02 315/291 |
| 2015/0016825 | A1* | 1/2015 | Haruyama | H04B 10/116 398/118 |
| 2015/0115830 | A1* | 4/2015 | Siessegger | H05B 33/0803 315/291 |
| 2015/0163878 | A1* | 6/2015 | Dixon | H05B 33/0845 315/201 |
| 2015/0250039 | A1* | 9/2015 | Zulim | G05F 1/10 315/307 |
| 2015/0281905 | A1* | 10/2015 | Breuer | H04W 4/026 398/118 |
| 2016/0330805 | A1* | 11/2016 | Briggs | H05B 33/0818 |

OTHER PUBLICATIONS

"Parallel circuit." The Hutchinson Unabridged Encyclopedia with Atlas and Weather Guide, edited by Helicon, 1st edition, 2016. Credo Reference, http://search.credoreference.com/content/entry/heliconhe/parallel_circuit/1. Accessed Jun. 19, 2017.*

* cited by examiner

COMMUNICATION INTERFACE DEVICE FOR A SOLID-STATE LUMINAIRE

CROSS-REFERENCE TO RELATED APPLICATIONS

This patent application claims the benefit of U.S. Provisional Patent Application No. 61/970,305), titled "Light Communication Protocol," filed on Mar. 25, 2014, which is herein incorporated by reference in its entirety.

FIELD OF THE DISCLOSURE

The present disclosure relates to solid-state lighting (SSL) and more particularly to light-based communication via SSL.

BACKGROUND

Global positioning system (GPS) devices are commonly used to facilitate navigation on Earth. These GPS devices are designed to communicate with orbiting satellites that transmit location and time information. Closer to the Earth's surface, such satellite-based navigation can be supplemented using local area wireless technologies, such as Wi-Fi, which utilize radio frequency (RF) signals to communicate with nearby compatible devices. These types of wireless technologies typically employ wireless access points (Wi-Fi hotspots) to establish network access, and in cases of secured wireless networks, a password or other security credentials normally must be provided in order to gain network access.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

A device is disclosed for providing a communication interface for a solid-state luminaire. In accordance with some embodiments, the disclosed device may be configured as a dongle, for example, that can be electrically coupled in a parallel or serial fashion between a driver and a solid-state light source. As such, the device may draw power from the existing power lines between the driver and solid-state light source, while also adjusting and, if desired, monitoring current going to the solid-state light source. In some cases, operative coupling of the disclosed device may allow for the solid-state light source to produce a modulated light output that can be used for purposes of light-based communication. In some embodiments, the device may split current received from the driver into a first portion that is returned to the driver or consumed within the device and a second portion that is time-modulated and delivered to the solid-state light source. In some other embodiments, the device may provide a time-varying impedance in series with the driver, reducing current received by the solid-state light source in a time-modulated manner. In either case, the solid-state light source may be caused to output a pulsing light signal encoded with data. Such a signal may be used, for example, in providing light-based communication with a computing device, mobile or otherwise, or other suitable receiver. In accordance with some other embodiments, the device may be configured to serve as a wireless radio beacon that may be used for positioning and indoor navigation applications, for example. In such cases, the device may receive a wired or wireless signal from a source external to the device and relay that signal to the driver, for instance, via power-line communication (PLC) or other suitable communication means. Numerous configurations and variations will be apparent in light of this disclosure.

General Overview

Existing approaches to powering autonomous sensors, radio beacons, and other smart-devices used in lighting control, building automation, and so-called smart-homes suffer from a number of difficulties. For instance, AC power lines are not always available for powering such devices. Batteries must be replaced when depleted. The dependability of harvesting energy from light, wind, temperature differences, mechanical motion, radio waves, and other alternative sources is limited. A wired digital addressable lighting interface (DALI) communication bus can be used to provide only limited electric power to devices coupled therewith, and the presence of those additional devices on the bus can negatively impact the reliability of bus communication. Furthermore, devices to be powered by a DALI communication bus must be mounted in locations where the bus runs, inhibiting flexibility in providing distributed system architectures. In addition to these complications, the ability to integrate existing devices is limited, as most sensor technologies require physical exposure to what they measure, and thus integration within another device or system can interfere with this end.

Thus, and in accordance with some embodiments of the present disclosure, a device is disclosed for providing a communication interface for a solid-state luminaire. The disclosed device may be configured, in accordance with some embodiments, as a dongle that can be electrically coupled in parallel or in series, as desired, between a driver and a solid-state light source of a solid-state luminaire. The electrical engagement can be accomplished, for instance, using a clamshell design configured with opposing insulation displacement connectors that provide electrical contact with the power lines running between the driver and solid-state light source, in accordance with an embodiment. In this manner, the disclosed device may be electrically coupled between the driver and solid-state light source(s), permitting it to draw power from the existing power lines running there between, while also permitting it to adjust and optionally monitor the current received by the downstream solid-state light source(s). In some instances, electrical coupling of the disclosed device may allow downstream solid-state light source(s) to provide a modulated light output suitable for light-based communication. In accordance with some embodiments, the device may split current received from the driver. A first portion of the current may be returned to the driver or consumed within the device. A second portion of the current may be time-modulated and delivered to the solid-state light source, causing it to output a pulsing light signal encoded with data. In accordance with some other embodiments, the device may provide a time-varying impedance (e.g., that appears in series with the driver) that reduces current received by the solid-state light source in a time-modulated manner, causing it to output a pulsing light signal encoded with data. In some still other embodiments, the disclosed device may draw power from the power lines between a driver and solid-state light source(s) without impacting the light emitted thereby. Numerous embodiments and variations will be apparent in light of this disclosure.

In accordance with an embodiment, the disclosed device may be compatible with any solid-state lighting driver, regardless of whether it is constant current or constant voltage, including digital and analog dimmable ones. In accordance with some embodiments, the disclosed device may be configured to communicate with the driver (or other component of an associated luminaire) using any one, or combination, of power-line communication (PLC), radio frequency (RF) signal communication, and modulated infrared (IR) light communication, among others. When paired with a solid-state luminaire, the disclosed device may serve, in accordance with some embodiments, as a wireless radio beacon that may be used for positioning and indoor navigation applications, for example. Positioning and indoor navigation routing capabilities may be provided via the device, for example, using visible light signals, RF signals, IR signals, or a combination thereof, as desired for a given target application or end-use. Numerous uses of the disclosed device will be apparent in light of this disclosure.

In accordance with some embodiments, the disclosed device may be configured to serve, for example, as a communication interface for a solid-state luminaire with which it is operatively coupled. More particularly, the disclosed device may be configured to communicate wirelessly or via a wired connection with a device external thereto, such as, for example, a wireless light sensor, wireless occupancy sensor, neighboring wireless luminaire, mobile commissioning device, or smartphone or other computing device (mobile or otherwise). The disclosed device also may be configured to communicate with a given driver of the solid-state luminaire, for example, via DC power-line communication (PLC) on the output power lines of that driver. In this manner, a communication interface may be provided between the external source device and the driver using the disclosed device, in accordance with an embodiment.

In accordance with some embodiments, the disclosed device may be used, for example, for retrofitting existing solid-state luminaires for light-based communication (LCom). As used herein, LCom generally refers to communication between a solid-state luminaire and a receiver device, such as another solid-state luminaire or a smartphone or other mobile computing device, using a pulsing light signal that emanates from the luminaire and is encoded with data. In general, the light utilized in LCom may be of any spectral band, visible or otherwise, and may be of any intensity, as desired for a given target application or end-use. In accordance with some embodiments, a given LCom-enabled luminaire (e.g., enabled by virtue of the disclosed device) may be configured to transmit a pulsing light signal encoded with data (an LCom signal), and a given receiver device, such as a smartphone or other mobile computing device, may be configured to detect the pulsing light signal encoded with data via one or more light-sensing devices, such as a camera or an ambient light sensor (or both).

In a more general sense, the disclosed device may be used to convert non-LCom-enabled lighting systems into LCom-enabled lighting systems using existing, non-LCom-enabled drivers, solid-state light sources, and other existing lighting componentry. As will be appreciated in light of this disclosure, original equipment manufacturers (OEMs) need not program a given solid-state luminaire in any particular manner for it to be capable of becoming LCom-enabled when the disclosed device is installed. The disclosed device may be configured to provide a quick and reliable electrical connection with the output of a driver (e.g., the LED output in the case of an LED driver), and in some cases may do so without need for tools or complicated wiring connections. As will be further appreciated, this may help to reduce maintenance and safety concerns.

Structure and Operation

Figure 1:
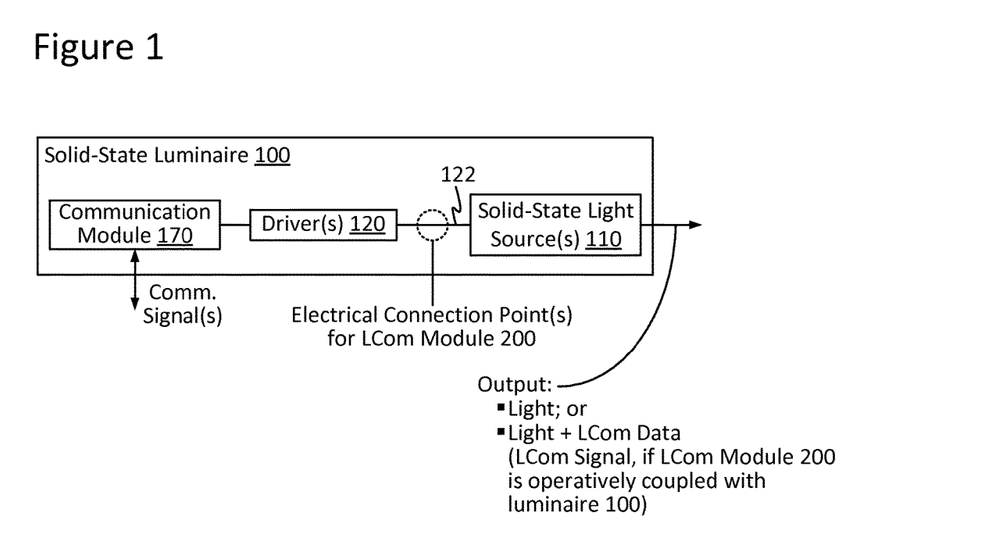
FIG. 1 is a block diagram of a solid-state luminaire configured in accordance with an embodiment of the present disclosure.

FIG. 1 is a block diagram of a solid-state luminaire 100 configured in accordance with an embodiment of the present disclosure. As can be seen, solid-state luminaire 100 includes one or more solid-state light sources 110. The quantity, density, and arrangement of solid-state light sources 110 may be customized as desired for a given target application or end-use. Solid-state light source(s) 110 may be wired in series, in parallel, or a combination thereof. A given solid-state light source 110 may be any semiconductor light source device, such as, for example, a light-emitting diode (LED), an organic light-emitting diode (OLED), or a polymer light-emitting diode (PLED), among others. The solid-state emitter(s) of a given solid-state light source 110 may be packaged or non-packaged, as desired, and in some cases may be populated on a printed circuit board (PCB) or other suitable intermediate or substrate.

The solid-state emitter(s) of a given solid-state light source 110 may be configured to emit light from any portion of the electromagnetic spectrum, such as, for example, the visible spectral band, the infrared (IR) spectral band, and the ultraviolet (UV) spectral band, among others. The emissions characteristics of a given solid-state light source 110 can be customized, as desired for a given target application or end-use. For instance, in some cases, a given solid-state light source 110 may be a white light-emitting semiconductor light source or otherwise configured for emissions of a single correlated color temperature (CCT). In some other cases, a given solid-state light source 110 may be a bi-color, tri-color, or other multi-color light-emitting semiconductor light source or otherwise configured for color-tunable emissions. Some example color combinations include red-green-blue (RGB), red-green-blue-yellow (RGBY), red-green-blue-white (RGBW), and dual-white, among others. In some still other cases, a given solid-state light source 110 may be a high-brightness semiconductor light source. Numerous suitable configurations for a given solid-state light source 110 will be apparent in light of this disclosure.

Figure 3A:
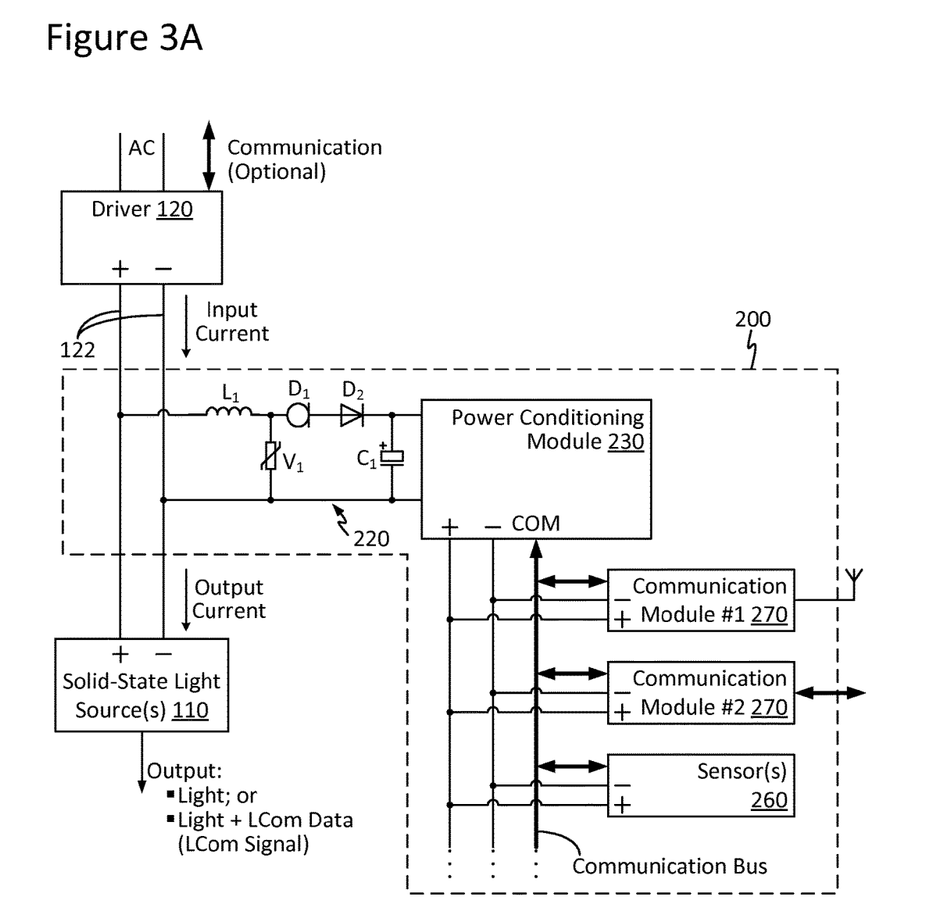
FIG. 3A is a circuit diagram of an LCom module electrically connected with a driver and one or more solid-state light sources of a solid-state luminaire in accordance with an embodiment of the present disclosure.
Figure 3B:
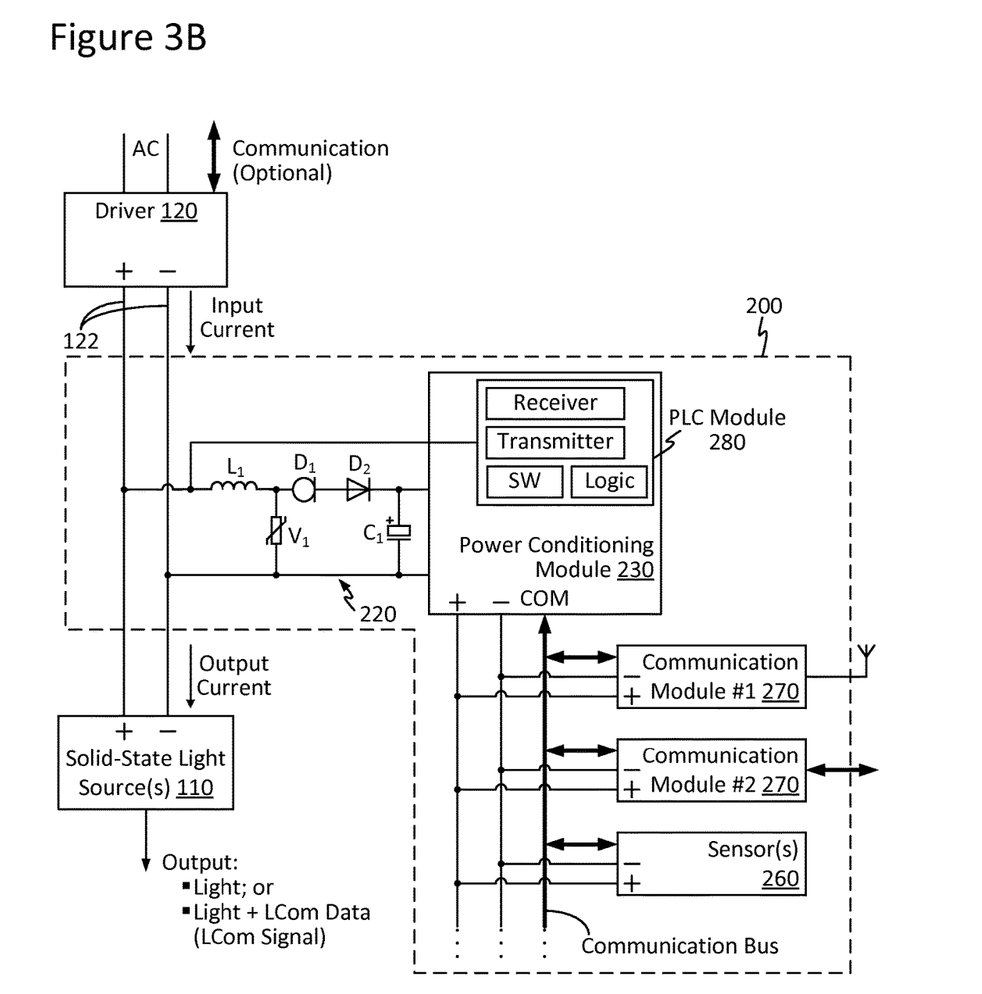
FIG. 3B is a circuit diagram of an LCom module electrically connected with a driver and one or more solid-state light sources of a solid-state luminaire in accordance with another embodiment of the present disclosure.

Also, as can be seen, solid-state luminaire 100 includes one or more drivers 120. A given driver 120 may be a single-channel or multi-channel solid-state lighting power supply, configured as typically done. In a specific example case, a given driver 120 may be a light-emitting diode (LED) driver, configured as typically done. A given driver 120 may be configured with any quantity and type of outputs, as desired for a given target application or end-use. In some example cases, a given driver 120 may include any one, or combination, of an LED output (e.g., in the case where driver 120 is an LED driver), a fan driver output, and a communication interface output, among others. In some cases in which a given driver 120 is a multi-channel driver, multiple LCom modules 200 may be operatively coupled at the outputs thereof depending on how many solid-state light sources 110 driven by that driver 120 are to provide LCom. A given driver 120 may be electrically coupled with an AC power source, for instance, as generally shown in FIGS. 3A-3B. In some embodiments, a given driver 120 optionally may be configured for wired (e.g., DALI, DMX, etc.) or wireless (e.g., ZigBee, etc.) communication with an external device, as generally shown in FIGS. 3A-3B.

A given driver 120 may be configured to utilize any suitable driving technique in driving the solid-state emitter(s) of a given solid-state light source 110 of the host solid-state luminaire 100. In some instances, a given driver 120 may be dimmable, utilizing any suitable dimming technique, such as, for example, pulse-width modulation (PWM) dimming, current dimming, constant current reduction (CCR) dimming, triode for alternating current (TRIAC) dimming, pulse-frequency modulation (PFM) dimming, pulse-code modulation (PCM) dimming, or line voltage (mains) dimming (e.g., dimmer is connected before input of driver 120 to adjust AC voltage to driver 120), among others. Thus, in accordance with some embodiments, a given driver 120 may be utilized in controlling the emissions characteristics of an associated solid-state luminaire 100, such as, for example, the on/off state and dimming level, among others. Other suitable driving techniques and configurations for the one or more drivers 120 will depend on a given application and will be apparent in light of this disclosure.

In accordance with some embodiments, solid-state luminaire 100 may include or otherwise have access to one or more communication modules 170. A given communication module 170 may be configured to facilitate communication between its associated solid-state luminaire 100 and an LCom module 200, a computing device (mobile or otherwise), another solid-state luminaire 100, or a combination thereof. In some cases, a given communication module 170 may be configured to facilitate communication between its associated solid-state luminaire 100 and one or more elements external thereto, such as, for example, lighting controls, a building control backbone, an LCom backbone network, a building management system (BMS), a Wi-Fi positioning system (WPS), or a global positioning system (GPS), among others. To such ends, a given communication module 170 may be configured to use any suitable communications means, such as, for example, radio frequency (RF) transmissions or modulated infrared (IR) light transmissions, among others. In some cases, a given communication module 170 may be configured for wired communication, for example, via Universal Serial Bus (USB), Ethernet, or FireWire, among others. In some cases, a given communication module 170 may be configured for wireless communication, for example, via Wi-Fi or Bluetooth, among others. In some instances, a given communication module 170 may be configured for a combination of wired and wireless communications. A given communication module 170 may be configured to communicate using any standard, custom, or proprietary communication protocol, such as, for example, a digital multiplexer (DMX) interface protocol, a Wi-Fi protocol, a Bluetooth protocol, a digital addressable lighting interface (DALI) protocol, a ZigBee protocol, or a combination thereof, among others. Other suitable configurations and wired and wireless communication means for a given communication module 170 will depend on a given application and will be apparent in light of this disclosure.

Figure 2:
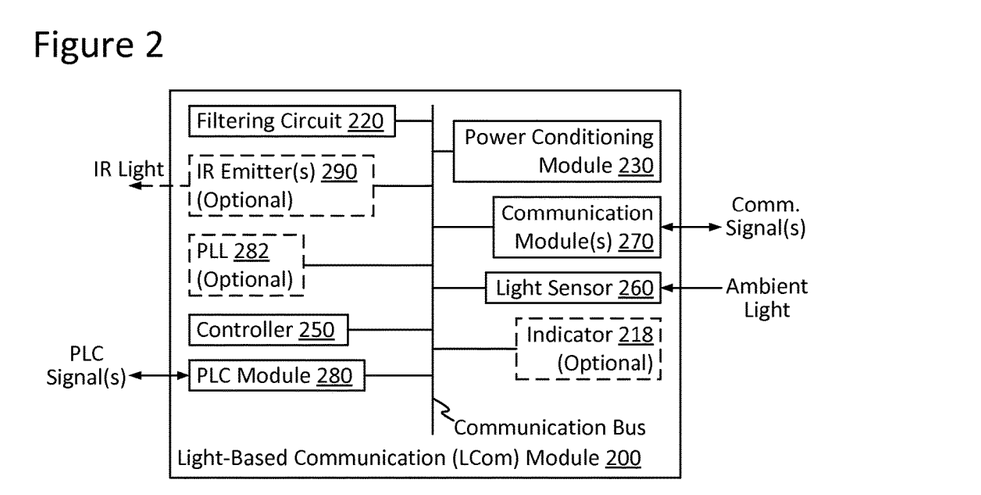
FIG. 2 is a block diagram of a light-based communication (LCom) module configured in accordance with an embodiment of the present disclosure.

In some cases, a given communication module 170 may be a wired digital communication interface, such as, for example, a DALI interface. In some instances, a given communication module 170 may be configured for powerline communication (PLC). Thus, such communication module(s) 170 may provide a PLC interface that may be used in relaying wireless RF messages (received by a given communication module 170) as DALI commands. In an example case, the combination of solid-state luminaire 100 and an LCom module 200 may provide a gateway for measurements from one or more other wireless sensors and switches to communication module 170 (e.g., the DALI bus interface). In another example case, an application on a computing device, mobile or otherwise, may send a Bluetooth command signal to LCom module 200 (e.g., received by a given communication module 270 thereof), which in turn relays that Bluetooth command signal to a given communication module 170 (e.g., the DALI bus interface) of solid-state luminaire 100. In this manner, the mobile or other computing device may serve as a remote control device for the solid-state luminaire 100 via the DALI interface connection between communication modules 170 and 270. Other suitable configurations for the one or more communication modules 170 will depend on a given application and will be apparent in light of this disclosure.

At least initially, solid-state luminaire 100 may be configured to output only light, as typically done. Upon operative coupling of an LCom module 200 with that solid-state luminaire 100, however, the resultant LCom-enabled luminaire 100 may possess the ability to also output light encoded with LCom data (e.g., an LCom signal). The LCom transmission characteristics of a given LCom-enabled luminaire 100 (i.e., solid-state luminaire 100 having an LCom module 200 operatively coupled therewith) may be customized, as desired for a given target application or end-use. For example, transmission of a given LCom signal may be performed at a given transmission rate over a given time interval, and in some cases, a given LCom-enabled luminaire 100 may be configured to repeatedly transmit an LCom signal. The LCom signal output of a given LCom-enabled luminaire 100 may be used to provide light-based communication, for example, between that LCom-enabled luminaire 100 and a local computing device (mobile or otherwise), another solid-state luminaire 100 (LCom-enabled or otherwise), or a combination thereof. Such LCom may be provided in one direction or in multiple directions (e.g., bi-directionally or otherwise multi-directionally), as desired. In accordance with some embodiments, the one or more solid-state light sources 110 of LCom-enabled luminaire 100 can be electronically controlled to output light, light encoded with LCom data (e.g., an LCom signal), or both.

Figure 4:
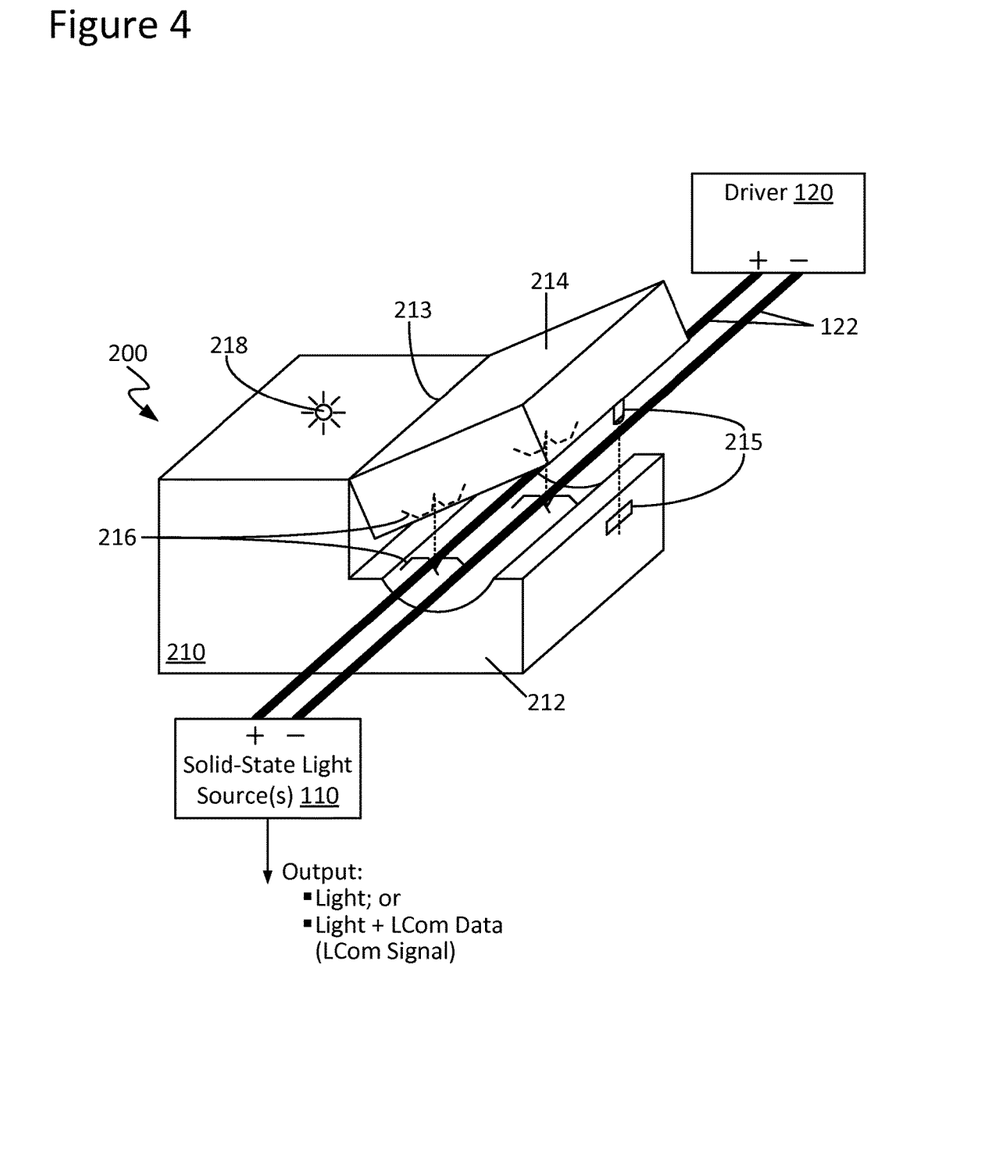
FIG. 4 is a perspective view of an LCom module configured in accordance with an embodiment of the present disclosure.

FIG. 2 is a block diagram of an LCom module 200 configured in accordance with an embodiment of the present disclosure. FIG. 3A is a circuit diagram of an LCom module 200 electrically connected with a driver 120 and one or more solid-state light sources 110 of a solid-state luminaire 100 in accordance with an embodiment of the present disclosure. FIG. 3B is a circuit diagram of an LCom module 200 electrically connected with a driver 120 and one or more solid-state light sources 110 of a solid-state luminaire 100 in accordance with another embodiment of the present disclosure. FIG. 4 is a perspective view of an LCom module 200 configured in accordance with an embodiment of the present disclosure. A given module (e.g., actuator module, electronic module, sensor module, etc.) of LCom module 200 may be configured to utilize a communication bus or other suitable interconnect in transmitting and receiving data.

As can be seen from these figures, LCom module 200 may include a housing 210. Housing 210 may be constructed from any suitable material, as will be apparent in light of this disclosure. Also, the dimensions and geometry of housing 210 may be customized, as desired for a given target application or end-use. The base portion 212 and clamping/flap portion 214 of housing 210 may be operatively coupled at a hinge portion 213, which provides a pivot point about which clamping portion 214 may rotate, at least partially, with respect to base portion 212. In this manner, clamping portion 214 may be closed over and brought into engagement (physical or otherwise) with base portion 212. Base portion 212 and clamping portion 214 may be securely engaged with one another, in a temporary or permanent manner, via an engagement feature 215. Engagement feature 215 may be any suitable means for maintaining engagement between base portion 212 and clamping portion 214, such as, for example, a tab-and-retainer fastener arrangement, a snap-fit fastener arrangement, an adhesive, or a combination thereof. In the example embodiment depicted in FIG. 4, the engagement feature 215 includes a male portion on clamping portion 214 and a female portion on base portion 212 that may be mated with one another. In that example case, clamping portion 214 may be closed over base portion 212 and snapped into place via engagement feature 215. Other suitable configurations for housing 210 will depend on a given application and will be apparent in light of this disclosure.

Also, as can be seen from the figures, LCom module 200 may be electrically connected with power lines 122 between a given upstream driver 120 and downstream solid-state light source(s) 110 to be driven thereby. More particularly, LCom module 200 may be configured to be operatively coupled, for example, at a given output of a given driver 120 (e.g., an LED output in the case of an LED driver 120), upstream of any downstream solid-state light source(s) 110. The quantity of input and output connections for LCom module 200 may be customized, as desired for a given target application or end-use. In an example embodiment, LCom module 200 may have a single input and a plurality of outputs. In such cases, LCom module 200 may split the current received from a single upstream driver 120 and output that split current to a plurality of downstream solid-state light sources 110. In some such instances, current splitting may be done in a dynamically changing pattern that provides for a given desired modulation of the light output of the downstream solid-state light sources 110.

To facilitate establishing an appropriate electrical connection between LCom module 200 and solid-state luminaire 100, housing 210 may include a set of electrical connectors 216 therein. The quantity and type of electrical connectors 216 may be customized, as desired, but in any case may provide an adequate electrical connection such that LCom module 200 is electrically coupled between driver 120 and solid-state light source(s) 110. In accordance with some embodiments, LCom module 200 may be electrically coupled in parallel with power lines 122, and in some such cases may be configured to serve as a modulated parallel resistor. In accordance with some other embodiments, LCom module 200 may be electrically coupled in series with power lines 122, and in some such cases may be configured to serve as a modulated series resistor. Numerous suitable configurations will be apparent in light of this disclosure.

In some embodiments, such as that shown in FIG. 4, housing 210 may include opposing pairs of self-stripping electrical insulation displacement connectors 216. A lead wire 122 of a driver 120 may be positioned between opposing electrical connectors 216. When clamping portion 214 of housing 210 is closed over base portion 212 and snapped into place via engagement feature 215, the electrical connectors 216 in clamping portion 214 may engage with corresponding electrical connectors 216 in base portion 212 to form an electrically conductive connection between a lead wire 122 and electrode(s) 216. In this manner, the lead wires 122 between a given driver 120 and solid-state light source(s) 110 to be driven thereby may be effectively stripped and electrically contacted via LCom module 200 without breaking the electrical connection between upstream driver 120 and the one or more downstream solid-state light sources 110, in accordance with some embodiments. In some such cases, LCom module 200 may serve as a self-cutting jig that leaves the electrical connection between driver 120 and solid-state light source(s) 110 intact, providing a parallel connection by which LCom module 200 may modulate the light output by changing its impedance (e.g., appearing as a parallel impedance element to driver 120).

In accordance with some other instances, however, LCom module 200 may effectively strip, cut, and re-wire the electrical connections between a given driver 120 and solid-state light source(s) 110 to be driven thereby, resulting in an electrical insulation displacement connection on both sides (e.g., for upstream driver 120 and the one or more downstream solid-state light sources 110). In some such cases, LCom module 200 may serve as a self-cutting jig that cuts the electrical connection between driver 120 and solid-state light source(s) 110, providing a series connection by which LCom module 200 may modulate the light output by changing its impedance (e.g., appearing as a series impedance element to driver 120). In any case, as will be appreciated in light of this disclosure, it may be desirable to ensure that the polarity of the lead wires 122 is correctly taken into account when positioning them in LCom module 200 prior to causing clamping portion 214 to engage base portion 212 to form the desired electrical connections, though in accordance with some embodiments, LCom module 200 may be configured with protection against damage that otherwise might result from a reverse-polarity connection.

In some other embodiments, LCom module 200 may include tool-free, flying lead connectors 216. In some still other embodiments, LCom module 200 may include a spade terminal connector, a pigtail connector, or any other suitable electrical connector type, as will be apparent in light of this disclosure. In any of these example cases, an electrical connection may be formed between LCom module 200 and an upstream driver 120 without the need for tools or complicated hardwiring procedures, in accordance with some embodiments. Other suitable configurations for electrical connectors 216 and techniques for electrically inserting LCom module 200 between a given driver 120 and solid-state light sources 110 to be driven thereby will depend on a given application and will be apparent in light of this disclosure. To this end, the appropriate electrical connection between driver 120, solid-state light source(s) 110, and LCom module 200 can be made automatically (e.g., by virtue of a clamshell engagement with insulation displacement connectors) or manually (e.g., hand-stripping and contacting; hand-cutting and splicing using push connectors or wire nuts).

In accordance with some embodiments, LCom module 200 may be configured to directly adjust the light output of downstream solid-state light source(s) 110 by causing adjustments in the current provided thereto by driver 120. More particularly, by electrically connecting LCom module 200 to a given upstream driver 120 and downstream solid-state light sources 110, it may be used to effectively modulate the light output of those solid-state light source(s) 110 even though the driver 120 may not be configured to output a modulated current in the first place. To such end, LCom module 200 may be configured, in accordance with an embodiment, to bypass a portion of the current output of an upstream driver 120 so that it is not supplied to the downstream solid-state light source(s) 110. LCom module 200 otherwise may be generally transparent in that most of the input current received from an upstream driver 120 flows through it to downstream solid-state light source(s) 110. The diverted portion of the current may be split into two parts. A first portion that is small and relatively constant may be either: (1) returned directly to the source driver 120; or (2) consumed inside LCom module 200, such as by being dissipated therein or used for some other purpose, such as generating IR light via IR emitter(s) 290 (discussed below) or powering other electronics within LCom module 200 or otherwise not native to the solid-state luminaire 100. The remainder of the diverted portion of the current may be used as bypass current in a time-modulated fashion to provide the modulation in light output according to the data to be transmitted by the solid-state light source(s) 110 as an LCom signal.

In accordance with another embodiment, LCom module 200 may be configured to temporarily serve as a high-impedance series element for the downstream solid-state light source(s) 110, thereby reducing the current received by the solid-state light source(s) 110 in a modulated and time-varying manner. Within LCom module 200, a transistor may be used to modulate the impedance that appears in series to the downstream solid-state light source(s) 110. The sum of both impedances—the time-varying impedance of LCom module 200 due to the modulation and the non-linear, but basically static impedance of the solid-state light source(s) 110 due to the non-linear characteristic of the solid-state light source(s) 110—may appear at the output of the driver 120 as its load.

As discussed above, the output of driver 120 (e.g., an LED output in the case of an LED driver 120) may be dimmed using any suitable analog or digital dimming protocol, such as, for example, pulse-width modulation (PWM). In accordance with some embodiments, LCom module 200 may be configured to detect whether a given upstream driver 120 is using PWM. To that end, LCom module 200 may include, in accordance with an embodiment, a controller 250 (e.g., a microcontroller) that is configured to randomly sample the output voltage of a driver 120 of interest. If the output voltage read by controller 250 shows dips with rising edges of relatively high dV/dt (e.g., exceeds a given threshold, standard, custom, or user-defined) or if the deviation between sampled measurements is large (e.g., exceeds a given threshold, standard, custom, or user-defined), then it may be assumed that the driver 120 of interest is using PWM. Other suitable techniques for determining what type of dimming protocol is being used by a given driver 120 will depend on a given application and will be apparent in light of this disclosure.

In accordance with some embodiments, LCom module 200 may include or otherwise have access to a filtering circuit 220. Filtering circuit 220 may be configured to reduce the ripple current present in the output of an upstream driver 120, providing a smooth current for downstream solid-state light source(s) 110, thereby improving the signal-to-noise ratio (SNR) of any LCom signal output thereby. To that end, filtering circuit 220 may include a low-pass filter that is inserted between the input of LCom module 200 and its bypass modulator. As will be appreciated in light of this disclosure, this configuration may significantly improve LCom signal SNR, for example, for a driver 120 that uses PWM. In some cases, filtering circuit 220 may include an active regulator, such as, for example, a linear regulator or a switch-mode regulator.

As can be seen from FIG. 3, for example, filtering circuit 220 may include a diode $D_2$ or a rectifier at the power input of LCom module 200 and connected to an output of a given driver 120. Diode $D_2$ may be, for example, a PN diode, a PIN diode, or a Schottky diode, among others. As will be appreciated in light of this disclosure, diode $D_2$ may provide energy storage while the output of driver 120 is not providing energy (e.g., off time during PWM cycle). As will be further appreciated, diode $D_2$ may provide protection against damage that otherwise could result if a user accidentally swaps which power line 122 goes with which electrical connector 216 and thus makes a reverse-polarity connection while installing LCom module 200.

Filtering circuit 220 also may include an electrolytic capacitor (e-cap) $C_1$ connected at the input stage. Furthermore, filtering circuit 220 may include an inductor $L_1$ and a diode $D_1$ electrically connected in series to the input of diode $D_2$. Diode $D_1$ may be, for example, a current-limiting diode (CLD) or other constant-current diode. As will be appreciated in light of this disclosure, inductor $L_1$ and diode $D_1$ may prevent driver 120 from shutting down at start-up (e.g., going into an over-current fault state) because driver 120 otherwise might detect a short-circuit condition at its output due to the large, uncharged electrolytic capacitor (e-cap) $C_1$.

In accordance with some embodiments, filtering circuit 220 may be configured to prevent or otherwise reduce back-talking, as the modulation of current for LCom signal(s) may not be seen by a given driver 120 or by the current control circuit thereof, thus allowing for regular operation of that driver 120. To that end, filtering circuit 220 diodes $D_1$, $D_2$ and the low-pass filter may be connected with a varistor $V_1$ (or other suitable suppressor) and a capacitor $C_1$ in parallel to the input of LCom module 200. This configuration may provide a series switch/transistor that provides PWM output to solid-state light source(s) 110 and prevents filter capacitor $C_1$ from being substantially drained during off-period of PWM cycle. As will be appreciated in light of this disclosure, this may help to prevent or otherwise reduce color shift in a given downstream solid-state light source 110, as well as reduce output under-voltage shutdown of a given driver 120 if that driver 120 samples the output voltage, as that driver 120 otherwise may not see the expected string voltage associated with the solid-state light source(s) 110 operatively coupled therewith. Other suitable configurations for filtering circuit 220 will depend on a given application and will be apparent in light of this disclosure.

In accordance with some embodiments, LCom module 200 may include or otherwise have access to a power conditioning module 230. In some cases, power conditioning module 230 may be, for example, a linear regulator, configured as typically done. In some other cases, power conditioning module 230 may be, for example, a DC-to-DC converter, configured as typically done. Some example suitable converters include a buck converter (step-down converter), a boost converter (step-up converter), a single-ended primary-inductor converter (SEPIC), and a boost-buck converter (split-pi converter) having two conversion stages, among others. In cases in which power conditioning module 230 is a DC-to-DC converter, it may be driven by a driver 120 in such a way that the input capacitor $C_1$ voltage stays substantially in the range (e.g., within ±10%) of the operating voltage of solid-state light source(s) 110. In some instances, this may provide LCom module 200 with gains in efficiency that provide a high SNR, which may be desirable, for example, for analog dimming of a given driver 120. In some cases, power conditioning module 230 may be configured to provide LCom module 200 with overvoltage protection. In some cases, LCom module 200 may be configured to provide galvanic isolation between its power input connected to a given driver 120 and its power output connected to, for example, solid-state light source(s) 110, a given wired communication module 270 (e.g., DALI, DMX, etc.), or a combination thereof. In some other embodiments, power conditioning module 230 may not include or otherwise have access to, for example, a DC-to-DC converter (e.g., such as in cases in which LCom module 200 need not process all energy directed thereto). Other suitable configurations for power conditioning module 230 will depend on a given application and will be apparent in light of this disclosure.

In accordance with some embodiments, LCom module 200 may include or otherwise have access to one or more communication modules 270. A given communication module 270 may be configured to facilitate communication between its associated LCom module 200 and any one, or combination, of a solid-state luminaire 100, a computing device (mobile or otherwise), another LCom module 200, or another communication module 270. In an example case, first and second communication modules 270 of an LCom module 200 may be configured to communicate with one another via a communication bus (e.g., an intra-dongle bus, or IDB). In some instances, the communication bus may be configured to serve as a communication interface, for example, to an external sensor (e.g., light sensor; occupancy sensor) or other external device. In an example case, the communication bus may be an inter-integrated circuit ($I^2C$) bus. In some cases, a given communication module 270 may be configured to facilitate communication between its associated LCom module 200 and one or more elements external thereto, such as, for example, lighting controls, a building control backbone, an LCom backbone network, a building management system (BMS), a Wi-Fi positioning system (WPS), or a global positioning system (GPS), among others. To such ends, a given communication module 270 may be configured to use any of the example communications means and transmission technologies and protocols discussed above, for instance, with respect to communication module(s) 170.

A given communication module 270 configured with wireless RF transmitter, receiver, or transceiver (i.e., transmitting and receiving) capabilities may be considered, in a general sense, a wireless radio. In an example embodiment, LCom module 200 may include a first communication module 270 configured to use a wireless ZigBee protocol and a second communication module 270 configured to use a wireless DALI protocol. In some instances, a given communication module 270 may be configured to allow for commissioning of a solid-state light source 100 operatively coupled with its associated LCom module 200. Signals pertaining to commissioning may be received by such a communication module 270, for example, from a computing device (mobile or otherwise) or other suitable source, as will be apparent in light of this disclosure. In some instances, a given communication module 270 may be configured to provide LCom module 200 with any one, or combination, of router, bridge, and gateway functionalities. Other suitable configurations and wired and wireless communication means for a given communication module 270 will depend on a given application and will be apparent in light of this disclosure.

In accordance with some embodiments, LCom module 200 may include or otherwise have access to a power-line communication (PLC) module 280. In some embodiments, PLC module 280 may be integrated in LCom module 200 (e.g., as generally shown in FIG. 2), whereas in some other embodiments, PLC module 280 may be integrated, in particular, in power conditioning module 230 of LCom module 200 (e.g., as generally shown in FIG. 3B). In any case, PLC module 280 may be configured to output one or more PLC signals. To that end, PLC module 280 may be configured as typically done, including logic or software (or both) and having transmitter, receiver, or transceiver (e.g., both transmitter and receiver) capabilities, as desired.

In accordance with some embodiments, PLC module 280 (or LCom module 200 otherwise) may include memory and a processor. The memory can be random-access memory (RAM), read-only memory (ROM), a combination thereof, or any other suitable memory type. The memory can be implemented with volatile memory, non-volatile memory, or a combination thereof. The memory can be of any size, as desired for a given target application or end-use. In some cases, the memory may be configured to be utilized for processor workspace for a given processor. In some cases, the memory may be configured for use in storing applications, media, programs, content, or a combination thereof, on a temporary or permanent basis. In some instances, the memory may have stored therein one or more modules. In some cases, the memory may have stored therein or otherwise have access to one or more software applications. A given module of the memory can be implemented in any suitable standard, custom, or proprietary programming language, such as, for example, C, C++, objective C, or JavaScript, among others. In accordance with some embodiments, a given processor of PLC module 280 (or LCom module 200 otherwise) may be configured to perform operations associated with the host LCom module 200. For instance, a given processor may be configured to access and execute a given module within the memory or otherwise accessible to LCom module 200.

In accordance with some embodiments, the module(s) of the memory can be encoded, for example, on a computer-readable medium that, when executed by a processor carries out the functionality of PLC module 280 (or LCom module 200 otherwise), in part or in whole. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and a number of embedded routines for carrying out device functionality. In a more general sense, the functional module(s) of the memory (e.g., one or more applications) can be implemented in hardware, software, firmware, or a combination thereof, as desired for a given target application or end-use.

In an example case, PLC module 280 may be configured to output a PLC signal including a request for a change in the output of a recipient driver 120. The PLC signal(s) may be transmitted by PLC module 280 over a DC power line 122 (or communication bus or other suitable interconnect) of solid-state luminaire 100 with which LCom module 200 is electrically connected. A given upstream driver 120 may receive the PLC signal(s) over any one or more of its outputs. In an example instance, PLC module 280 may be electrically connected upstream of inductor $L_1$ with the positive output of a driver 120, as can be seen from FIG. 3B. The recipient driver 120 may use the PLC signal(s) in adjusting its current output for purposes of adjusting (e.g., modulating) the light output of downstream solid-state light source(s) 110. In accordance with an embodiment, a given driver 120 and PLC module 280 may operate together in a manner so as to be considered, in a general sense, a wireless access point to a host-side network. In some cases, PLC module 280 may be configured to provide PLC via existing electrical connections (e.g., existing between a given driver 120 and solid-state light source(s) 110. In some instances, PLC module 280 may be configured to communicate directly with a communication module 270, which in turn may communicate with other element(s) external to LCom module 200. Other suitable configurations for PLC module 280 will depend on a given application and will be apparent in light of this disclosure.

In accordance with some embodiments, LCom module 200 may include one or more infrared (IR) emitters 290 (e.g., IR LEDs) configured to output IR light. This IR light may be used, in accordance with an embodiment, for IR-based communication between LCom module 200 and any one, or combination, of a solid-state luminaire 100, a computing device (mobile or otherwise), another LCom module 200, or a communication module 270. As discussed above, a portion of the current received by LCom module 200 from a given upstream driver 120 may be diverted, whereas the remaining current may be delivered to downstream solid-state light source(s) 110. This diverted current may be used, in accordance with an embodiment, to drive IR emitter(s) 290 of LCom module 200. The resultant IR light pattern (i.e., emitted IR light having its intensity modulated over time) produced by IR emitter(s) 290 may mirror the visible light pattern (i.e., emitted visible light having its intensity modulated over time) produced by downstream solid-state light source(s) 110. Thus, and in accordance with an embodiment, a computing device (mobile or otherwise) or other suitable sensor may detect and decode either or both of the IR light and visible light, each of which may include the full information (e.g., LCom data) to be transmitted by solid-state luminaire 100. Simultaneous detection of the IR light and visible light output may facilitate error detection and correction given that it is unlikely that both the IR and visible light signals will be corrupted in the same way. In the manner of this redundancy, reliable light-based communication (e.g., with a computing device, mobile or otherwise) may be provided.

As will be appreciated in light of this disclosure, IR-based communication may benefit from an unobstructed line of sight (LOS) between communicating elements. Thus, in cases in which LCom module 200 is installed within solid-state luminaire 100, it may be desirable to position LCom module 200 therein such that an IR signal transmitted by its IR emitter(s) 290 may pass through an opening (and optionally optics) in the housing of solid-state luminaire 100. Other suitable configurations for IR emitter(s) 290 will depend on a given application and will be apparent in light of this disclosure.

In accordance with some embodiments, LCom module 200 may include or otherwise have access to one or more sensors 260. For example, in some cases, LCom module 200 may include or otherwise have access to a light sensor 260 configured to detect ambient light levels (e.g., of the surrounding environment of LCom module 200 and solid-state luminaire 100) and output a signal including data pertaining to that stimulus. Such a light sensor 260 may be configured to utilize the communication bus of LCom module 200 in transmitting and receiving ambient light level measurements or other data. In accordance with an embodiment, LCom module 200 may be configured to utilize ambient light level measurements output by a light sensor 260 in controlling the output current of a given upstream driver 120 before receipt thereof by downstream solid-state light source(s) 110. In this manner, LCom module 200 may serve, in a general sense, as a sort of daylight harvesting system for purposes of controlling the output of a solid-state luminaire 100 with which that LCom module 200 is operatively coupled.

In some other cases, LCom module 200 may include or otherwise have access to an occupancy sensor 260 configured to detect the presence of an occupant (e.g., of the surrounding environment of LCom module 200 and solid-state luminaire 100) and output a signal including data pertaining to that stimulus. Such an occupancy sensor 260 may be configured to utilize the communication bus of LCom module 200 in transmitting and receiving occupancy or other data. In accordance with an embodiment, LCom module 200 may be configured to utilize occupancy data output by an occupancy sensor 260 in controlling the output of a given upstream driver 120 before receipt thereof by downstream solid-state light source(s) 110.

It should be noted, however, that the present disclosure is not so limited to inclusion of a given sensor 260 only in LCom module 200, as in accordance with some other embodiments, a given sensor 260 may be integrated with solid-state luminaire 100 rather than, or in addition to, LCom module 200. In such cases, LCom module 200 may communicate with such a sensor 260 via any one, or combination, of a communication module 270 and PLC module 280. Other suitable configurations for a given sensor 260 will depend on a given application and will be apparent in light of this disclosure.

In accordance with some embodiments, LCom module 200 may include a phase-locked loop (PLL) 282. PLL 282 may be configured, for example, to synchronize on the PWM clock of a given driver 120, if PWM mode is detected by LCom module 200. This may allow for determining the duty cycle of the output of such a driver 120 and tailoring of the modulation accordingly so that LCom data integrity remains substantially intact regardless of the duty cycle of the dimming. Other suitable configurations for PLL 282 will depend on a given application and will be apparent in light of this disclosure.

In accordance with some embodiments, LCom module 200 optionally may include an indicator 218. Indicator 218 may be any suitable emitter, solid-state or otherwise, configured to emit light, visible or otherwise, which may serve as an indicator of a given condition of operation of LCom module 200. In an example case, indicator 218 may be configured to light up if the voltage over electrolytic capacitor (e-cap) $C_1$ is sufficiently high and shut off if insufficient voltage is present (e.g., to conserve energy at very low dimming levels). In another example case, indicator 218 may be configured to light up upon successful establishment of an electrical connection between LCom module 200 and one or more lead wires 122 of a driver 120, helping an installer to determine whether installation of LCom module 200 was successful. Also, the output of indicator 218 may be constant, periodic, intermittent, or at a given interval, which may be user-configurable in some instances. In an example case, the duty cycle of blink pulses may be less than or equal to about 1:10 (e.g., to conserve energy consumption by LCom module 200). Other suitable configurations for indicator 218 will depend on a given application and will be apparent in light of this disclosure.

In accordance with some embodiments, LCom module 200 may be configured to measure the current supplied to downstream solid-state light source(s) 110 and thus serve, in a general sense, as a wired or wireless luminaire activity monitor. For instance, in an example embodiment, LCom module 200 may include a LEDset2 interface, available from Osram Sylvania, Inc. In such cases, the third pin/LEDset2 pin may be wired through, observed and read, or both. Current information gleaned therefrom may be used, for instance, to determine the maximum current of LCom module 200 so that it will not overdrive solid-state light source(s) 110 when modulating currents, as may be a concern in cases of an LCom module 200 having particularly high efficiency.

In accordance with an embodiment, LCom module 200 may have a unique identification (ID) that is programmed into it at the end of the manufacturing process. Thus, original equipment manufacturers (OEMs) need not program a given solid-state luminaire 100 in any particular manner for it to become LCom-enabled once an LCom module 200 is installed. In addition, in cases in which multiple LCom modules 200 are operatively coupled with a given solid-state luminaire 100, the unique IDs thereof may facilitate determining which LCom module 200 is which for purposes of controlling light and LCom signal output.

As described herein, LCom module 200 may be configured, in accordance with some embodiments, to output and receive any of a wide range of wired and wireless signals (e.g., RF, IR, LCom). In some cases, such signals may contain indoor navigation routing information that may be utilized, for example, for positioning or indoor navigation. In some other cases, such signals may contain commands or other instructions that may be utilized, for example, in modulating or otherwise adjusting the output of a driver 120 with which the LCom module 200 is operatively coupled. In a more general sense, the data contents of a given signal output or received by LCom module 200 may be customized, as desired for a given target application or end-use.

Numerous embodiments will be apparent in light of this disclosure. One example embodiment provides a device including: a power input configured to be electrically coupled in parallel with an output of a driver of a solid-state luminaire to draw power therefrom; a power output configured to be electrically coupled in parallel with an input of a solid-state light source of the solid-state luminaire; and a power conditioning module electrically coupled between the power input and the power output and configured to communicate with at least one of: the driver; and a communication module operatively coupled with the power conditioning module and configured to communicate with a signal source external to the device. In some cases, the device further includes the communication module, wherein: the communication module is configured to communicate with the external signal source using at least one of a digital multiplexer (DMX) interface protocol, a Wi-Fi protocol, a Bluetooth protocol, a digital addressable lighting interface (DALI) protocol, and a ZigBee protocol; and the device is configured to adjust power provided to the solid-state light source in response to receipt of a signal by the communication module from the external signal source. In some instances, the device is configured as a wireless radio beacon configured to at least one of transmit and receive data about at least one of positioning and indoor navigation routing. In some cases, the device further includes a power-line communication (PLC) module configured to output a PLC signal to the driver, the PLC signal including instruction for adjustment in the output of the driver. In some instances, the device further includes at least one of an ambient light sensor and an occupancy sensor, wherein the device is configured to use data output by the at least one of an ambient light sensor and an occupancy sensor in adjusting power provided to the solid-state light source by the driver. In some cases, the device further includes a filtering circuit electrically coupled between the power input and the power conditioning module and configured to reduce ripple current in the output of the driver. In some such cases, the filtering circuit includes: a first diode at the power input of the device and configured to be electrically coupled with the output of the driver, wherein the first diode includes at least one of a PN diode, a PIN diode, and a Schottky diode, and wherein the first diode provides at least one of: energy storage while the driver is not outputting energy during an off time of a pulse-width modulation (PWM) cycle; and protection against damage that would result if a reverse-polarity connection is made when electrically coupling the device with the output of the driver; a second diode electrically coupled in series with the first diode, wherein the second diode includes a current-limiting diode (CLD); an inductor electrically coupled in series with the second diode, wherein the inductor and the second diode prevent the driver from going into an over-current fault state during startup; an electrolytic capacitor electrically coupled in parallel with the power input of the device; and a varistor electrically coupled in parallel with the power input of the device. In some other such cases, the filtering circuit includes at least one of a low-pass filter, a linear regulator, and a switch-mode regulator electrically coupled with the first diode. In some instances, the power conditioning module includes at least one of a linear regulator, a buck converter, a boost converter, a single-ended primary-inductor converter (SEPIC), and a boost-buck converter and is configured to provide at least one of: overvoltage protection for the device; and galvanic isolation between the power input and the power output of the device. In some cases, the solid-state light source is a light-emitting diode (LED); the driver is an LED driver; and the power input of the device is configured to be electrically coupled in parallel with an LED output of the LED driver to draw power therefrom. In some instances, the device further includes a controller configured to sample an output voltage of the driver to determine at least one of: whether the output voltage exhibits dips with rising edges having a dV/dt that exceeds a threshold; and whether deviation between sampled measurements exceeds a threshold. In some cases, the device further includes a phase-locked loop (PLL) configured to synchronize on a pulse-width modulation (PWM) clock of the driver. In some instances, the power conditioning module is configured to modulate power provided to the solid-state light source, providing the solid-state light source with the ability to output a pulsing light signal encoded with data. In some such instances, in providing the solid-state light source with the ability to output the pulsing light signal encoded with data, the device is configured to split current received from the driver into at least: a first current portion that is at least one of returned to the driver and used by the device to power a constituent component thereof; and a second current portion that is time-modulated and delivered to the solid-state light source to cause it to output the pulsing light signal encoded with data. In some such instances, the device further includes an infrared (IR) emitter, wherein: the first current portion is used by the device to drive the IR emitter; and an intensity of IR light emitted by the IR emitter is time-modulated in a manner that mirrors modulation of the pulsing light signal encoded with data emitted by the solid-state light source, such that the pulsing light signal and the IR light are at least partially redundant in data. In some other such cases, in providing the solid-state light source with the ability to output the pulsing light signal encoded with data, the device is configured to provide a time-varying impedance that reduces current received by the solid-state light source from the driver in a time-modulated manner, wherein a sum of the time-varying impedance of the device and an impedance of the solid-state light source appears at the output of the driver as its load. In some other such cases, the device is configured as a wireless radio beacon configured to cause the solid-state light source to emit a pulsing light signal encoded with data about at least one of positioning and indoor navigation routing information.

Another example embodiment provides a device including: first and second self-stripping electrical insulation displacement connectors configured to be brought into engagement with one another to provide electrical coupling with a first electrical lead between a driver and a solid-state light source; and third and fourth self-stripping electrical insulation displacement connectors configured to be brought into engagement with one another to provide electrical coupling with a second electrical lead between the driver and the solid-state light source; wherein the device is configured to communicate with at least one of: the driver; and a signal source external to the device. In some cases, the device further includes a housing including: a base portion on which the first and third self-stripping electrical insulation displacement connectors are disposed; and a clamping portion coupled with the base portion via a hinge portion and on which the second and fourth self-stripping electrical insulation displacement connectors are disposed. In some such cases, the device further includes an engagement feature configured to maintain secure engagement between the first and third self-stripping electrical insulation displacement connectors and the second and fourth self-stripping electrical insulation displacement connectors.

Another example embodiment provides a method of communicating using a solid-state luminaire, the method including: receiving, via a power conditioning module electrically coupled in parallel with an output power line of a driver of the solid-state luminaire and an input power line of a solid-state light source of the solid-state luminaire, a first signal from at least one of: a sensor operatively coupled with the power conditioning module; and a communication module operatively coupled with the power conditioning module and configured to communicate with a signal source external to the solid-state luminaire; and outputting, via the power conditioning module, a second signal to at least one of the driver and the communication module. In some cases, the communication module is configured to communicate with the external signal source using at least one of a digital multiplexer (DMX) interface protocol, a Wi-Fi protocol, a Bluetooth protocol, a digital addressable lighting interface (DALI) protocol, and a ZigBee protocol, and the method further includes: adjusting power provided to the solid-state light source in response to receipt of a signal by the communication module from the external signal source. In some instances, the sensor includes at least one of an ambient light sensor and an occupancy sensor, and the method further includes: adjusting power provided to the solid-state light source based on data received from the at least one of an ambient light sensor and an occupancy sensor.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. Device comprising:
    a power input configured to be electrically coupled in parallel with an output of a driver of a solid-state luminaire to draw power therefrom;
    a power output configured to be electrically coupled in parallel with an input of a solid-state light source of the solid-state luminaire; and
    a power conditioning module electrically coupled between the power input and the power output and configured to communicate with at least one of:
    the driver; and
    a communication module operatively coupled with the power conditioning module and configured to communicate with a signal source external to the device.

2. The device of claim 1 further comprising the communication module, wherein:
    the communication module is configured to communicate with the external signal source using at least one of a digital multiplexer (DMX) interface protocol, a Wi-Fi protocol, a Bluetooth protocol, a digital addressable lighting interface (DALI) protocol, and a ZigBee protocol; and
    the device is configured to adjust power provided to the solid-state light source in response to receipt of a signal by the communication module from the external signal source.

3. The device of claim 1, wherein the device is configured as a wireless radio beacon configured to at least one of transmit and receive data about at least one of positioning and indoor navigation routing.

4. The device of claim 1 further comprising a power-line communication (PLC) module configured to output a PLC signal to the driver, the PLC signal including instruction for adjustment in the output of the driver.

5. The device of claim 1 further comprising at least one of an ambient light sensor and an occupancy sensor, wherein the device is configured to use data output by the at least one of an ambient light sensor and an occupancy sensor in adjusting power provided to the solid-state light source by the driver.

6. The device of claim 1 further comprising a filtering circuit electrically coupled between the power input and the power conditioning module and configured to reduce ripple current in the output of the driver.

7. The device of claim 6, wherein the filtering circuit comprises:
a first diode at the power input of the device and configured to be electrically coupled with the output of the driver, wherein the first diode comprises at least one of a PN diode, a PIN diode, and a Schottky diode, and wherein the first diode provides at least one of:
energy storage while the driver is not outputting energy during an off time of a pulse-width modulation (PWM) cycle; and
protection against damage that would result if a reverse-polarity connection is made when electrically coupling the device with the output of the driver;
a second diode electrically coupled in series with the first diode, wherein the second diode comprises a current-limiting diode (CLD);
an inductor electrically coupled in series with the second diode, wherein the inductor and the second diode prevent the driver from going into an over-current fault state during startup;
an electrolytic capacitor electrically coupled in parallel with the power input of the device; and
a varistor electrically coupled in parallel with the power input of the device.

8. The device of claim 6, wherein the filtering circuit comprises at least one of a low-pass filter, a linear regulator, and a switch-mode regulator electrically coupled with a first diode.

9. The device of claim 1, wherein the power conditioning module comprises at least one of a linear regulator, a buck converter, a boost converter, a single-ended primary-inductor converter (SEPIC), and a boost-buck converter and is configured to provide at least one of:
overvoltage protection for the device; and
galvanic isolation between the power input and the power output of the device.

10. The device of claim 1, wherein:
the solid-state light source is a light-emitting diode (LED);
the driver is an LED driver; and
the power input of the device is configured to be electrically coupled in parallel with an LED output of the LED driver to draw power therefrom.

11. The device of claim 1 further comprising a controller configured to sample an output voltage of the driver to determine at least one of:
whether the output voltage exhibits dips with rising edges having a dV/dt that exceeds a threshold; and
whether deviation between sampled measurements exceeds a threshold.

12. The device of claim 1 further comprising a phase-locked loop (PLL) configured to synchronize on a pulse-width modulation (PWM) clock of the driver.

13. The device of claim 1, wherein the power conditioning module is configured to modulate power provided to the solid-state light source, providing the solid-state light source with the ability to output a pulsing light signal encoded with data.

14. The device of claim 13, wherein in providing the solid-state light source with the ability to output the pulsing light signal encoded with data, the device is configured to split current received from the driver into at least:
a first current portion that is at least one of returned to the driver and used by the device to power a constituent component thereof; and
a second current portion that is time-modulated and delivered to the solid-state light source to cause it to output the pulsing light signal encoded with data.

15. The device of claim 14 further comprising an infrared (IR) emitter, wherein:
the first current portion is used by the device to drive the IR emitter; and
an intensity of IR light emitted by the IR emitter is time-modulated in a manner that mirrors modulation of the pulsing light signal encoded with data emitted by the solid-state light source, such that the pulsing light signal and the IR light are at least partially redundant in data.

16. The device of claim 13, wherein in providing the solid-state light source with the ability to output the pulsing light signal encoded with data, the device is configured to provide a time-varying impedance that reduces current received by the solid-state light source from the driver in a time-modulated manner, wherein a sum of the time-varying impedance of the device and an impedance of the solid-state light source appears at the output of the driver as its load.

17. The device of claim 13, wherein the device is configured as a wireless radio beacon configured to cause the solid-state light source to emit a pulsing light signal encoded with data about at least one of positioning and indoor navigation routing information.

18. A method of communicating using a solid-state luminaire, the method comprising:
receiving, via a power conditioning module electrically coupled in parallel with an output power line of a driver of the solid-state luminaire and an input power line of a solid-state light source of the solid-state luminaire, a first signal from at least one of:
a sensor operatively coupled with the power conditioning module; and
a communication module operatively coupled with the power conditioning module and configured to communicate with a signal source external to the solid-state luminaire; and
outputting, via the power conditioning module, a second signal to at least one of the driver and the communication module.

19. The method of claim 18, wherein the communication module is configured to communicate with the external signal source using at least one of a digital multiplexer (DMX) interface protocol, a Wi-Fi protocol, a Bluetooth protocol, a digital addressable lighting interface (DALI) protocol, and a ZigBee protocol, and wherein the method further comprises:
adjusting power provided to the solid-state light source in response to receipt of a signal by the communication module from the external signal source.

20. The method of claim 18, wherein the sensor comprises at least one of an ambient light sensor and an occupancy sensor, and wherein the method further comprises:
adjusting power provided to the solid-state light source based on data received from the at least one of an ambient light sensor and an occupancy sensor.

* * * * *